United States Patent
Sha

(10) Patent No.: US 12,236,790 B2
(45) Date of Patent: Feb. 25, 2025

(54) UAV POSITIONING METHOD AND DEVICE, AND STORAGE MEDIUM

(71) Applicant: BEIJING JINGDONG QIANSHI TECHNOLOGY CO., LTD., Beijing (CN)

(72) Inventor: Chengxian Sha, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 144 days.

(21) Appl. No.: 18/250,240

(22) PCT Filed: Aug. 31, 2021

(86) PCT No.: PCT/CN2021/115673
§ 371 (c)(1),
(2) Date: Apr. 24, 2023

(87) PCT Pub. No.: WO2022/116609
PCT Pub. Date: Jun. 9, 2022

(65) Prior Publication Data
US 2023/0410662 A1  Dec. 21, 2023

(30) Foreign Application Priority Data
Dec. 2, 2020  (CN) .......................... 202011403625.4

(51) Int. Cl.
*G01S 19/47* (2010.01)
*G08G 5/00* (2006.01)

(52) U.S. Cl.
CPC ............ *G08G 5/0008* (2013.01); *G01S 19/47* (2013.01)

(58) Field of Classification Search
CPC ............................ G08G 5/0008; G01S 19/47
See application file for complete search history.

(56) References Cited

U.S. PATENT DOCUMENTS
2018/0356532 A1  12/2018  Im

FOREIGN PATENT DOCUMENTS
CN  105607054 A  5/2016
CN  108490473 A  9/2018
(Continued)

OTHER PUBLICATIONS

International Search Report in the international application No. PCT/CN2021/115673, mailed on Nov. 26, 2021, 2 pages.
(Continued)

*Primary Examiner* — Mathew Franklin Gordon
(74) *Attorney, Agent, or Firm* — Cooper Legal Group, LLC

(57) ABSTRACT

Disclosed are an unmanned aerial vehicle positioning method and apparatus, and a storage medium. The unmanned aerial vehicle positioning method comprises: when a first unmanned aerial vehicle loses a satellite positioning signal, determining first information and second information of each of at least three second unmanned aerial vehicles on the basis of a UWB signal, wherein the first information represents a relative distance between each second unmanned aerial vehicle and the first unmanned aerial vehicle, and the second information is carried by the second unmanned aerial vehicle in a transmitted UWB signal and represents real-time positioning information measured by the second unmanned aerial vehicle on the basis of the satellite positioning signal; and determining real-time positioning information of the first unmanned aerial vehicle according to the first information and the second information of each of the at least three second unmanned aerial vehicles.

20 Claims, 2 Drawing Sheets

101 — First information and second information of each of at least three second UAVs are determined based on a UWB signal in a case where a satellite positioning signal of a first UAV is lost 102 — Real-time positioning information of the first UAV is determined according to the first information and the second information of each of the at least three second UAVs

(56) References Cited

FOREIGN PATENT DOCUMENTS

| CN | 108521670 A | 9/2018 |
|---|---|---|
| CN | 109154833 A | 1/2019 |
| CN | 109911188 A | 6/2019 |
| CN | 110455285 A | 11/2019 |
| CN | 110632553 A | 12/2019 |
| CN | 110716222 A | 1/2020 |
| CN | 111473784 A | 7/2020 |
| FR | 3096129 A1 | 11/2020 |
| KR | 20170040961 A | 4/2017 |

OTHER PUBLICATIONS

English translation of the Written Opinion of the International Search Authority in the international application No. PCT/CN2021/115673, mailed on Nov. 26, 2021, 4 pages.

Goel Salil et al: "Posterior Cramér Rao Bounds for Cooperative Localization in Low-Cost UAV Swarms", Journal of the Indian Society of Remote Sensing, Springer India, India, vol. 47, No. 4, Nov. 27, 2018 (Nov. 27, 2018), pp. 671-684, XP036747380, ISSN: 0255-660X, DOI: 10.1007/S12524-018-0899-3, abstract, p. 672-p. 682.

De Haag Maarten Uijt et al: "sUAS Swarm Navigation using Inertial, Range Radios and Partial GNSS", 2019 IEEE/Aiaa 38TH Digital Avionics Systems Conference (DASC), IEEE, Sep. 8, 2019 (Sep. 8, 2019), pp. 1-10, XP033765487, DOI: 10.1109/DASC43569.2019.9081793, figure 9, section V.A. Initial-only Solution.

Supplementary European Search Report in the European application No. 21899645.2, mailed on Oct. 31, 2024. 9 pages.

UAV POSITIONING METHOD AND DEVICE, AND STORAGE MEDIUM

CROSS-REFERENCE TO RELATED APPLICATION

This application is filed based upon and claims priority to Chinese Patent Application No. 202011403625.4 filed on Dec. 2, 2020, the disclosure of which is hereby incorporated by reference in its entirety.

TECHNICAL FIELD

The present disclosure relates to the field of communication positioning, and in particular to, an Unmanned Aerial Vehicle (UAV) positioning method and device, and a storage medium.

BACKGROUND

With the further improvement of UAV technology, logistics UAVs have been applied to a certain extent. In order to improve transportation efficiency, the logistics UAVs will also perform distribution and transportation tasks in the form of UAV formation. An operation scene of the logistics UAV formation has characteristics such as empty and vast. For a single logistics UAV in the formation, its positioning is highly dependent on the Global Positioning System (GPS). When its GPS signal is lost, the single logistics UAV can only depend on its own Inertial Navigation System (INS) for short-term inertial attitude determination and positioning. If the GPS signal of the single logistics UAV cannot be recovered during this short period, the logistics UAV will take a measure of forced landing at a random position. Thus, the logistics UAV will not only fail to successfully complete the task, but also cause great potential safety hazards in a region below the flight area.

SUMMARY

In view of this, the main purpose of embodiments of the present disclosure is to provide a UAV positioning method and device, and a storage medium, so as to solve the problem of inaccurate attitude determination and positioning of a single logistics UAV in the formation after a GPS signal is lost.

The technical proposal of the embodiments of the present disclosure is implemented as follows.

Embodiments of the present disclosure provide a UAV positioning method, and the method includes:
  determining first information and second information of each of at least three second UAVs based on an Ultra Wide Band (UWB) signal in a case where a satellite positioning signal of the first UAV is lost, where the first information represents a relative distance between each second UAV and the first UAV, and the second information is carried in the UWB signal sent by the second UAV and represents real-time positioning information measured by the second UAV based on a satellite positioning signal; and
  determining real-time positioning information of the first UAV according to the first information and the second information of each of the at least three second UAVs.

In the scheme, the method further includes: before determining the real-time positioning information of the first UAV according to the first information and the second information of each of the at least three second UAVs,
  determining the real-time positioning information of the first UAV based on an Inertial Navigation System (INS) in the case where the satellite positioning signal of the first UAV is lost.

In the scheme, the operation of determining the first information and the second information of each of the at least three second UAVs based on the UWB signal includes:
  determining the first information and the second information of each of the at least three second UAVs based on the UWB signal in a case where a duration during which the real-time positioning information of the first UAV is performed based on the INS is longer than a set duration.

In the scheme, the method further includes:
  extracting the first information from the UWB signal sent by the second UAV; or
  measuring the first information based on the UWB signal sent by the second UAV.

In the scheme, the method further includes:
  sending a first request based on the UWB signal in the case where the satellite positioning signal of the first UAV is lost, where the first request is used for requesting the second UAV to carry the second information in the UWB signal.

In the scheme, the method further includes:
  exchanging the UWB signal with the at least three second UAVs every first set period.

In the scheme, the method further includes:
  in a case where it is detected that the first UAV has resumed receiving the satellite positioning signal, determining the real-time positioning information of the first UAV based on the received satellite positioning signal.

Embodiments of the present disclosure also provide a UAV positioning device, including:
  a first determining unit, configured to determine first information and second information of each of at least three second UAVs based on an Ultra Wide Band (UWB) signal in a case where a satellite positioning signal of the first UAV is lost, where the first information represents a relative distance between each second UAV and the first UAV, and the second information is carried in the UWB signal sent by the second UAV and represents real-time positioning information measured by the second UAV based on a satellite positioning signal; and
  a second determining unit, configured to determine real-time positioning information of the first UAV according to the first information and the second information of each of the at least three second UAVs.

Embodiments of the present disclosure also provide a first UAV including a processor and a memory configured to store computer programs capable of running on the processor.

The processor is configured to perform the operations of the method of any one of claims 1-7 when running the computer programs.

Embodiments of the present disclosure also provide a storage medium having stored thereon computer programs that, when executed by a processor, cause the processor to perform the operations of any one of the methods above.

In the embodiments of the present disclosure, the first information and the second information of each of the at least three second UAVs are determined based on the UWB signal in the case where the satellite positioning signal of the first UAV is lost. The first information represents the relative distance between each second UAV and the first UAV, and the second information is carried in the UWB signal sent by the second UAV and represents the real-time positioning information measured by the second UAV based on the satellite positioning signal. The real-time positioning information of the first UAV is determined according to the first information and the second information of each of the at least three second UAVs. In this way, when the satellite positioning signal of a single UAV in the formation is lost, the relative distances between the single UAV and other UAVs in the formation as well as GPS positioning information of other UAVs can be obtained based on the UWB signal, so as to determine the accurate attitude determination and positioning information of the single UAV, thereby improving the reliability of UAVs on the way to perform distribution tasks, and improving the transportation efficiency.

DETAILED DESCRIPTION

Figure 1:
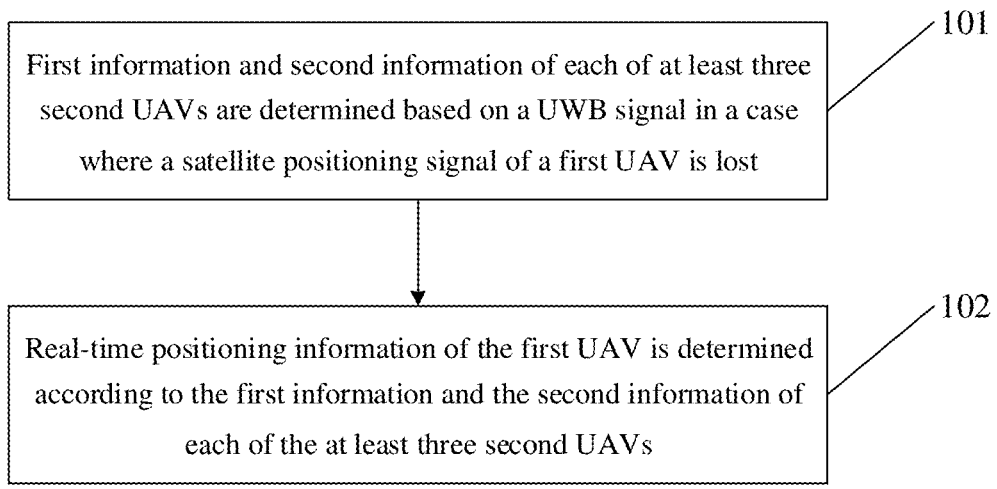
FIG. 1 is a flowchart of a UAV positioning method according to an embodiment of the present disclosure.

The present disclosure is described in further detail below with reference to the accompanying drawings and specific embodiments.

In the following description, for purposes of illustration and not for purposes of limitation, specific details such as particular system structures, techniques and the like are set forth in order to provide a thorough understanding of embodiments of the present disclosure. However it will be apparent to those skilled in the art that the present disclosure may be practiced in other embodiments without these specific details. In other instances, detailed descriptions of well-known systems, devices and methods are omitted so as not to obstruct the description of the present disclosure with unnecessary details.

It should be noted that the technical proposals described in the embodiments of the present disclosure can be arbitrarily combined without conflict.

In addition, in the embodiments of the present disclosure the terms "first", "second" and the like are used for distinguishing similar objects and need not be used for describing a particular sequence or priority. The term "and/or" is simply an association relationship that describes associated objects, and the term indicates that there can be three relationships. For example, A and/or B, which can mean that there are three situations: A alone, A and B, and B alone. In addition, the term "at least three" means any combination of any three or at least four of multiple ones, for example, including at least three of A, B, C or D, may mean including any three or more elements selected from the set composed of A, B, C and D.

In a flight process of a logistics UAV performing a distribution task, the logistics UAV needs to continuously obtain a real-time positioning to ensure accurate flight according to a predetermined route. The logistics UAV usually adopts a satellite positioning system, such as the GPS, for the real-time positioning. However, in a case where the satellite signal of a certain UAV in a logistics UAV formation is lost, the UAV can only depend on its own INS for the short-term attitude determination and positioning.

When the single logistics UAV in the formation only depends on its own INS for the short-term inertial attitude determination and positioning, the INS updates measurement results of speed, position and attitude depending on inertial sensors (such as accelerometer or gyroscope) and by integration. Because of the zero point deviation of the inertial sensor, errors accumulated over time will be produced, and these errors cannot be eliminated by fusing satellite positioning data. Thus, the errors are directly reflected in the measurement results of the speed, position and attitude of the single logistics UAV. That is to say, in related technologies, accurate attitude determination and positioning cannot be performed on the single logistics UAV in the formation in the case where the satellite positioning signal is lost, which may lead to unpredictable flight of the logistics UAV.

In view of this, the embodiments of the present disclosure provide a UAV positioning method, which is applied to a UAV. In practical applications, the first UAV can be any UAV in logistics UAV formation. FIG. 1 is a flowchart of a UAV positioning method according to an embodiment of the present disclosure. As shown in FIG. 1, the method includes operations 101 and 102.

In operation 101, first information and second information of each of at least three second UAVs are determined based on a UWB signal in a case where a satellite positioning signal of the first UAV is lost.

The first information represents a relative distance between each second UAV and the first UAV, and the second information is carried in the UWB signal sent by the second UAV and represents real-time positioning information measured by the second UAV based on a satellite positioning signal Herein, the satellite positioning signal can be a GPS signal, a Global Navigation Satellite System (GLONASS) signal, a Galileo satellite navigation system signal or a Beidou positioning signal. For convenience of description, the embodiments of the present disclosure are described below with the GPS signals as an example.

The basic principle of GPS positioning is that a position of a point to be measured is determined using a method of space distance resection based on an instantaneous position of a high-speed moving satellite taken as known initial calculation data.

The case where the GPS signal of the first UAV is lost may be a case where a communication board inside the UAV and used for receiving the GPS signal is damaged, or a case where the UAV cannot smoothly receive the satellite signal due to too many environmental interference factors in a certain area where the UAV flies, which results in the loss of the GPS signal.

Herein, the first information and second information of each of the at least three second UAVs are determined based on the UWB signal. The UWB technology is a wireless carrier communication technology, which is implemented based on a method of Time of Flight (TOF) and a method of Two Way-Time Of Flight (TW-TOF). The TOF measures a distance between the first UAV and the second UAV by mainly using the flight time of a signal going back and forth between asynchronous transceivers of the first UAV and the second UAV. In the TW-TOF, the first UAV and the at least three second UAVs generate respective independent time stamps when they starts; a transmitter of the first UAV sends a pulse signal with a requesting nature at a time T1 on its own time stamp, and each of the at least three second UAVs sends a signal with a responsive nature at a time T2, which is received by the first UAV at a T2 time on its own time stamp. Therefore, the flight time of the pulse signal between the first UAV and each second UAV can be calculated, and the flight distance between the first UAV and each second UAV can be determined by the flight time in combination with the speed of light. In the embodiment of that present disclosure, the principle of positioning the first UAV based on the UWB technology is that: at least three other second UAVs in the formation with known positions are used, the first UAV to be positioned carries a positioning tag that sends pulses according to a certain frequency so that distances between the positioning tag and the at least three second UAVs with known positions are continuously measured, and then the position of the positioning tag can be accurately calculated through a certain algorithm. The UWB technology has strong penetration ability, and can perform accurate positioning in indoor, outdoor and underground cases. Unlike the GPS providing an absolute geographical position, a relative position can be given by the UWB technology, and the positioning accuracy of the UWB technology can reach centimeter level.

Herein, the first information represents a relative distance between each second UAV and the first UAV. The relative distance between each second UAV and the first UAV is measured using signal measurement based on the UWB technology. The second information is carried in the UWB signal sent by the second UAV and represents real-time positioning information measured by the second UAV based on the GPS signal. When the GPS signal of the first UAV is lost, the second UAV will attach real-time positioning information measured through its own GPS signal to the UWB signal sent by the second UAV to the first UAV, so that the UWB signal is used by the first UAV for determining its real-time positioning information.

In operation 102, the real-time positioning information of the first UAV is determined according to the first information and the second information of each of the at least three second UAVs.

Figure 2:
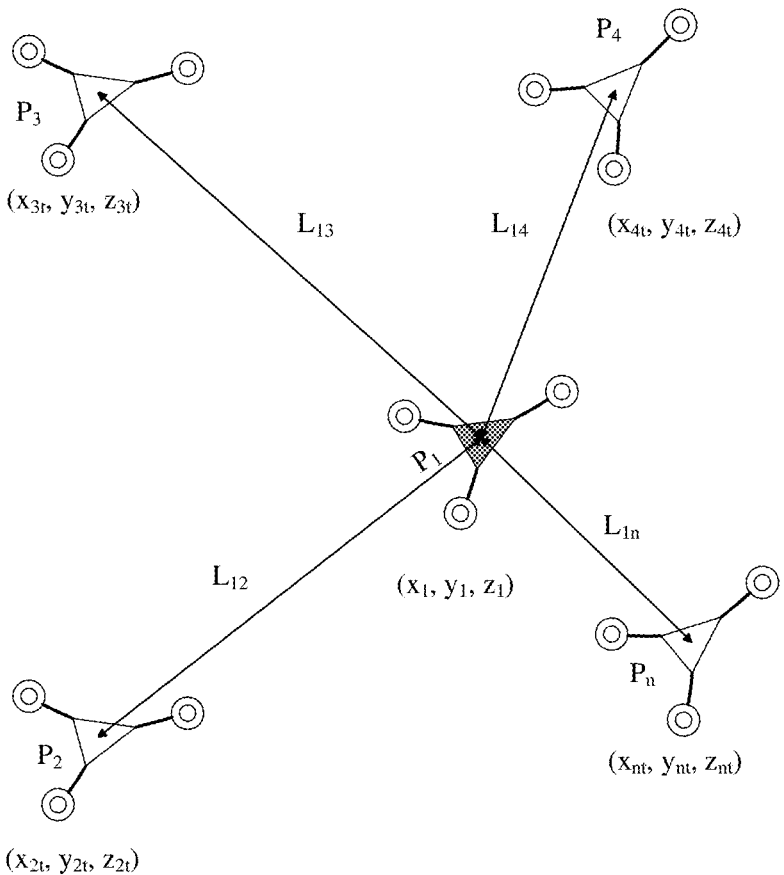
FIG. 2 is a schematic diagram of determining real-time positioning information of a first UAV by using a second UAV according to an embodiment of the present disclosure.

Herein, FIG. 2 shows a schematic diagram of determining real-time positioning information of a first UAV by using other second UAVs. According to FIG. 2, in a process of performing a distribution task by a formation of the logistics UAVs P={$P_1, P_2, P_3, P_4 \ldots P_n, n \geq 4$}, the GPS signal of the first UAV $P_1$ is lost occurs, at the time t after the GPS signal is lost, the first UAV determines the first information and the second information of the second UAVs in the formation based on the UWB signal. The first information represents the relative distance between each second UAV and the first UAV: $L_{12}, L_{13}, L_{14}, \ldots, L_{1n}$, where $L_{12}$ represents the distance between the first UAV $P_1$ and the second UAV $P_2$. Similarly, $L_{1n}$ represents the distance between the first UAV $P_1$ and the second UAV $P_n$. The second information is the real-time positioning information measured by the second UAV based on its own GPS signal: {$x_{2t}, y_{2t}, y_{2t}$}, {$x_{3t}, y_{3t}, z_{3t}$}, {$x_{4t}, y_{4t}, z_{4t}$}, ..., {$x_{nt}, y_{nt}, z_{nt}$}, where {$x_{2t}, y_{2t}, z_{2t}$} represents the real-time positioning measured by the second UAV $P_2$ through its own GPS signal at time t, and similarly, {$x_{nt}, y_{nt}, z_{nt}$} represents the real-time positioning measured by the second UAV P n through its own GPS signal at time t.

The operation of determining the real-time positioning information of the first UAV according to the first information and the second information of each of the at least three second UAVs includes two operations as following.

The first UAV acquires a set of the first information, i.e. a set of relative distances between multiple second UAVs and the first UAV: L={$L_{12}, L_{13}, L_{14}, \ldots, L_{1n}$}.

The first UAV acquires a set of the second information, i.e. a set of the real-time positioning information of the second UAVs: S={{$x_{2t}, y_{2t}, z_{2t}$}, {$x_{3t}, y_{3t}, z_{3t}$}, {$x_{4t}, y_{4t}, z_{4t}$}, ..., {$x_{nt}, y_{nt}, z_{nt}$}}.

After the distances between the second UAVs and the first UAV are measured through the TOF or the TW-TOF, the first UAV calculates the position of the first UAV by trilateral positioning method, and the real-time positioning information of the first UAV can be obtained. The trilateral positioning method constructs a circular trajectory by using the relative distance between each second UAV and the first UAV as a radius. Because there is a unique intersection point among three circular trajectories intersecting with each other, at least three second UAVs are required to determine the real-time information of the first UAV based on the UWB signal, and the position information of the unique intersection point is the positioning information of the first UAV. The specific calculation formula is as follows.

$$\begin{cases} L_{12}^2 = (x_{2t} - x_1)^2 + (y_{2t} - y_1)^2 + (z_{2t} - z_1)^2 \\ L_{13}^2 = (x_{3t} - x_1)^2 + (y_{3t} - y_1)^2 + (z_{3t} - z_1)^2 \\ L_{14}^2 = (x_{4t} - x_1)^2 + (y_{4t} - y_1)^2 + (z_{4t} - z_1)^2 \\ \quad \vdots \\ L_{1n}^2 = (x_{nt} - x_1)^2 + (y_{nt} - y_1)^2 + (z_{nt} - z_1)^2 \end{cases} \quad \text{formula 1}$$

Formula 1 is linearized by subtracting the n-th row equation from the 1st row equation to (n−1)-th row equation, respectively, and the result is as follows.

$$AX=b, \quad \text{formula 2,}$$

X is the positioning coordinates of the first UAV $P_1$ at time t, $$X = \begin{pmatrix} x_1 \\ y_1 \\ z_1 \end{pmatrix}, A = \begin{bmatrix} 2(x_{2t} - x_{nt}) & 2(y_{2t} - y_{nt}) & 2(z_{2t} - z_{nt}) \\ 2(x_{3t} - x_{nt}) & 2(y_{3t} - y_{nt}) & 2(z_{3t} - z_{nt}) \\ 2(x_{4t} - x_{nt}) & 2(y_{4t} - y_{nt}) & 2(z_{4t} - z_{nt}) \\ \vdots & \vdots & \vdots \\ 2(x_{(n-1)t} - x_{nt}) & 2(y_{(n-1)t} - y_{nt}) & 2(z_{(n-1)t} - z_{nt}) \end{bmatrix}, \text{ and}$$

$$b = \begin{bmatrix} x_{2t}^2 - x_{nt}^2 + y_{2t}^2 - y_{nt}^2 + z_{2t}^2 - z_{nt}^2 + L_{12}^2 - L_{1n}^2 \\ x_{3t}^2 - x_{nt}^2 + y_{3t}^2 - y_{nt}^2 + z_{3t}^2 - z_{nt}^2 + L_{13}^2 - L_{1n}^2 \\ x_{4t}^2 - x_{nt}^2 + y_{4t}^2 - y_{nt}^2 + z_{4t}^2 - z_{nt}^2 + L_{14}^2 - L_{1n}^2 \\ \vdots \\ x_{(n-1)t}^2 - x_{nt}^2 + y_{(n-1)t}^2 - y_{nt}^2 + z_{(n-1)t}^2 - z_{nt}^2 + L_{1(n-1)}^2 - L_{1n}^2 \end{bmatrix}.$$

The formula 2 is solved by using the least square method to obtain: $X=(A^TA)^{-1}A^Tb$. The obtained X is the real-time position of the first UAV P 1 at time t.

It should be noted that the solution of Formula 1 is not limited to the least square method mentioned above, and other specific algorithms capable of solving Formula 1 should also be regarded as the methods that can be adopted by the embodiments of the present disclosure, such as a Taylor algorithm, a weighted least square method, a convex optimization algorithm, and a machine learning algorithm.

In the embodiments, the first information and the second information of each of the at least three second UAVs are determined based on the UWB signal in the case where the satellite positioning signal of the first UAV is lost, where the first information represents the relative distance between each second UAV and the first UAV, and the second information is carried in the UWB signal sent by the second UAV and represents the real-time positioning information measured by the second UAV based on the satellite positioning signal; and the real-time positioning information of the first UAV is determined according to the first information and the second information of each of the at least three second UAVs. In this way, in the case where the satellite positioning signal of the single UAV in the formation is lost, the relative distances between the single UAV and other UAVs in the formation as well as the GPS positioning information of other UAVs can be obtained based on the UWB signal, so as to determine the accurate attitude determination and positioning information of the single UAV, thereby improving the reliability of the UAVs on the way to perform the distribution task, and improving the transportation efficiency.

In an embodiment, before the real-time positioning information of the first UAV is determined according to the first information and the second information of each of the at least three second UAVs, the method further includes the following operation.

The real-time positioning information of the first UAV is determined based on an INS in the case where the satellite positioning signal of the first UAV is lost.

Herein, in the case where the satellite positioning signal of the first UAV is lost, the first UAV does not immediately receive the first information and the second information of the second UAVs based on the UWB signal. Instead, the first UAV firstly enters a mode where attitude determination and positioning is performed by using its INS.

The working principle of the INS lies in: automatically performing integral operation on the measured acceleration of the first UAV to obtain instantaneous speed data and instantaneous position data of the first UAV. The devices that constitute the INS are installed in the body of the first UAV, and when working, the devices do not need to rely on external information or radiate energy to the outside, and is not easy to be interfered. Such an INS is an autonomous navigation system.

By starting the INS for positioning after the satellite positioning signal is lost, it can be ensured that the first UAV can rely on itself for relatively accurate attitude determination and positioning before the real-time positioning information is determined based on the UWB signal when the satellite positioning signal is lost.

On the basis of determining the real-time positioning of the first UAV based on the INS after the satellite positioning signal is lost, the operation of determining the first information and the second information of each of the at least three second UAVs based on the UWB signal includes the following operation.

The first information and the second information of each of the at least three second UAVs are determined based on the UWB signal in a case where a duration during which the real-time positioning information of the first UAV is determined based on the INS is longer than a set duration.

Herein, the set duration during which the real-time positioning of the first UAV is performed based on the INS can be set to N seconds, for example, N can be set to 2. When the first UAV detects that the GPS signal is still not recovered after N seconds, the first information and the second information of each of the at least three second UAVs are determined based on the UWB signal.

Because the positioning information of INS is generated by integration, the positioning error will increase over time, and the accuracy is poor if the positioning is performed relying on the INS for a long time. Therefore, after the duration during which the first UAV performs the positioning through the INS is longer than the set duration, the positioning information is determined based on the UWB signal. In this way, the positioning error caused by using the INS for a long time can be avoid, so that the first UAV can thus obtain more accurate positioning information.

In an embodiment, the method further includes the following operation.

The first information is extracted from the UWB signal sent by the second UAV.

Alternatively, the first information is measured based on the UWB signal sent by the second UAV.

Herein, the first information may be measured by the second UAV and carried in the UWB signal sent by the second UAV to the first UAV. That is to say, the relative distance between the second UAV and the first UAV is measured by the second UAV, so that the first UAV can directly extract the information representing the relative distance from the UWB signal sent by the second UAV. Alternatively, the second UAV does not measure the first information, and the first UAV measures the relative distance between the first UAV and the second UAV by itself based on the UWB signal sent by the second UAV.

With the method above, the first UAV extracts the first information from the UWB signal sent by the second UAV, so that the first information can be directly obtained without calculation, thereby reducing the calculation amount of the first UAV. The first UAV measures by itself to obtain the corresponding first information based on the UWB signal sent by the second UAV, which can reduce the amount of data transmitted between the first UAV and the second UAV.

In an embodiment, the method further includes the following operation.

A first request is sent based on the UWB signal in the case where the satellite positioning signal of the first UAV is lost, where the first request is used for requesting the second UAV to carry the second information in the UWB signal.

Herein, in a case where the satellite positioning signal of the first UAV is not lost, the first UAV always communicate with the second UAV through the UWB signal. Therefore, in this case, only the relative distance between the second UAV and the first UAV can be determined based on the UWB signal sent by the second UAV.

In the case where the satellite positioning signal of the first UAV is lost, the first UAV needs to perform the positioning by using the UWB signal. Therefore, in addition to obtaining the relative distance between the second UAV and the first UAV, it is also necessary to obtain the real-time positioning information of the second UAV. Therefore, the first UAV sends the first request based on the UWB signal, and the first request is used for requesting the second UAV to carry the second information in the UWB signal.

With the method above, the first UAV can timely obtain, based on the UWB signal, the relative distance between the first UAV and the second UAV and the real-time positioning information of the second UAV, which are required for determining positioning information of the first UAV, so that the accurate positioning can be performed.

In an embodiment, the method further includes the following operation.

The UWB signal is exchanged between the first UAV and the at least three second UAVs every first set period.

Herein, the UWB signal is exchanged between the first UAV and the at least three second UAVs every first set period, which can not only implement other functions based on the UWB signal, but also ensure that the relative distance between the first UAV and the second UAV and the real-time positioning information obtained based on the satellite positioning signal of the second UAV can still be obtained through the periodically sent UWB signals in the case where the satellite positioning signal of the first UAV is lost. In addition, after the satellite positioning signal of the first UAV is lost, the first set period can be automatically shortened and adjusted to ensure the update frequency of the first information and the second information, thus ensuring the accuracy of the positioning information after the satellite positioning signal of the first UAV is lost.

In an embodiment, the method further includes the following operation.

In a case where it is detected that the first UAV has resumed receiving the satellite positioning signal, the real-time positioning information of the first UAV is determined based on the received satellite positioning signal.

Herein, while the first UAV obtains the real-time positioning based on the UWB signal, the first UAV always detects whether the satellite positioning signal of the first UAV is recovered. Once it is detected that the satellite positioning signal is recovered, the first UAV obtains the real-time positioning information by using the satellite positioning signal. If the satellite positioning signal is still not recovered, the first UAV continues to use the UWB signal to obtain the real-time positioning information.

With the method above, the first UAV detects whether the satellite positioning signal is recovered while obtaining the real-time positioning by using the UWB signal, and can start the satellite positioning signal for real-time positioning immediately when the satellite positioning signal is recovered, thereby ensuring the continuity of accurate real-time positioning.

Figure 3:
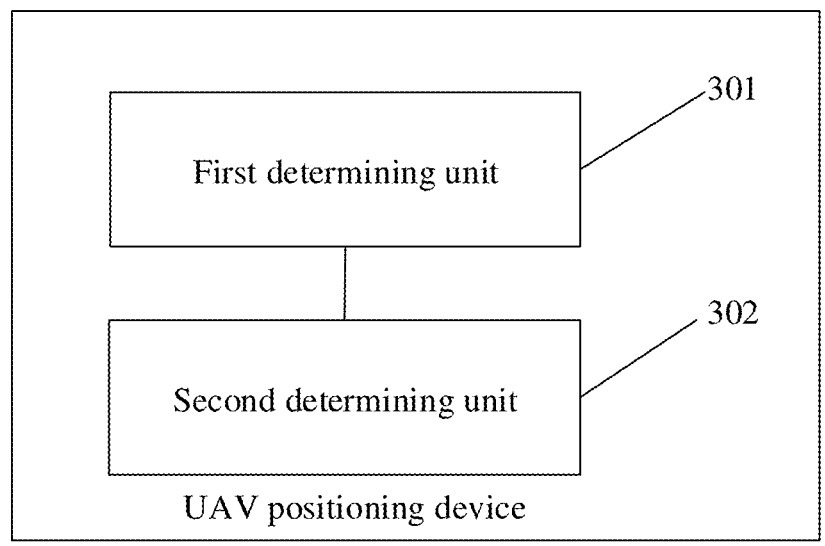
FIG. 3 is a schematic diagram of a UAV positioning device according to an embodiment of the present disclosure.

In order to implement the method of the embodiments of the present disclosure, the embodiments of the present disclosure also provide UAV positioning device, as shown in FIG. 3. The device includes a first determining unit 301 and a second determining unit 302.

The first determining unit 301 is configured to determine first information and second information of each of at least three second UAVs based on a UWB signal in a case where a satellite positioning signal of the first UAV is lost, where the first information represents a relative distance between each second UAV and the first UAV, and the second information is carried in the UWB signal sent by the second UAV and represents real-time positioning information measured by the second UAV based on a satellite positioning signal The second determining unit 302 is configured to determine real-time positioning information of the first UAV according to the first information and the second information of each of the at least three second UAVs.

In an embodiment, the device further includes a third determining unit.

The third determining unit is configured to determine the real-time positioning information of the first UAV based on the INS in the case where the satellite positioning signal of the first UAV is lost.

In an embodiment, the first determining unit 301 is configured to:
determine the first information and the second information of each of the at least three second UAVs based on the UWB signal in a case where a duration during which the real-time positioning information of the first UAV is determined based on the INS is longer than a set duration.

In an embodiment, the device further includes an information acquiring unit.

The information acquiring unit is configured to extract the first information from the UWB signal sent by the second UAV.

Alternatively, the information acquiring unit is configured to measure the first information based on the UWB signal sent by the second UAV.

In an embodiment, the device further includes a request unit.

The request unit is configured to send a first request based on the UWB signal in the case where the satellite positioning signal of the first UAV is lost, where the first request is used for requesting the second UAV to carry the second information in the UWB signal.

In an embodiment, the device further includes an exchanging unit.

The exchanging unit is configured to exchange the UWB signal with the at least three second UAVs every first set period.

In an embodiment, the device further includes a fourth determining unit.

The fourth determining unit is configured to determine the real-time positioning information of the first UAV based on the received satellite positioning signal in a case where it is detected that the first UAV has resumed receiving the satellite positioning signal.

In practical applications, the first determining unit 301, the second determining unit 302, the third determining unit, the information acquiring unit, the request unit, the exchanging unit and the fourth determining unit can be realized by a communication interface in the UAV positioning device in combination with a processor. Of course, the processor needs to run the programs stored in the memory to realize the functions of the above program modules.

It should be noted that, when the UAV positioning device provided by the embodiments performs the UAV positioning, the division of the above program modules is for illustration only. In practical applications, the processing can be assigned to different program modules according to requirements, that is, the internal structure of the device can be divided into different program modules to complete all or a part of the processing described above. In addition, the UAV positioning device provided by the above embodiments belongs to the same idea as the embodiments of the UAV positioning method, and the specific implementation process of the device is detailed in the embodiments of the method, which will not be repeated herein.

Figure 4:
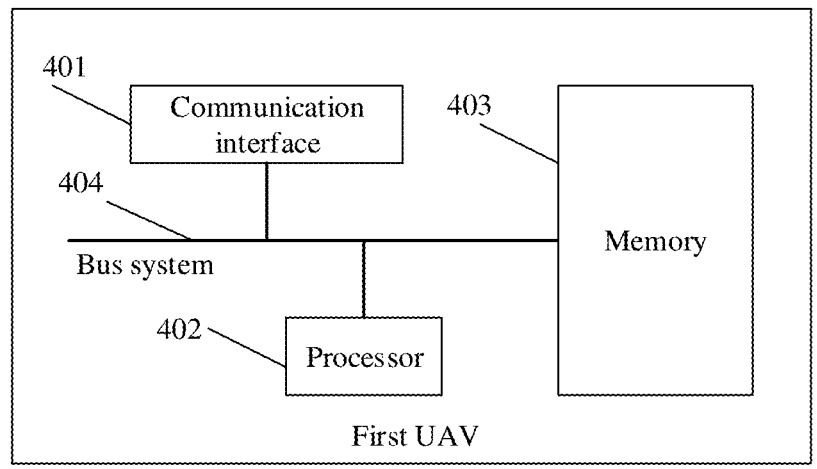
FIG. 4 is a schematic structural diagram of a first UAV according to an embodiment of the present disclosure.

Based on the hardware realizations of the program modules, and in order to implement the method of the embodiments of the present disclosure, the embodiments of the present disclosure also provide a first UAV. FIG. 4 is a schematic diagram of the hardware composition structure of the first UAV of an embodiment of the present disclosure. As shown in FIG. 4, the first UAV includes a communication interface 401 and a processor 402.

The communication interface 401 can exchange information with other devices such as a network device.

The processor 402 is connected with the communication interface 401 to implement information interaction with other devices, and is configured to perform the UAV positioning method provided by one or more of the above technical proposals when the processor 402 runs computer programs. The computer programs are stored on a memory 403.

Specifically, the processor 402 is configured to determine first information and second information of each of at least three second UAVs based on the UWB signal in a case where a satellite positioning signal of the first UAV is lost, where the first information represents a relative distance between each second UAV and the first UAV, and the second information is carried in the UWB signal sent by the second UAV and represents real-time positioning information measured by the second UAV based on a satellite positioning signal.

The processor 402 is further configured to determine real-time positioning information of the first UAV according to the first information and the second information of each of the at least three second UAVs.

In an embodiment, before the real-time positioning information of the first UAV is determined according to the first information and the second information of each of the at least three second UAVs, the processor 402 is specifically configured to:
determine the real-time positioning information of the first UAV based on an INS in the case where the satellite positioning signal of the first UAV is lost.

In an embodiment, the processor 402 is configured to:
determine the first information and the second information of each of the at least three second UAVs based on the UWB signal in a case where a duration during which the real-time positioning information of the first UAV is performed based on the INS is longer than a set duration.

In an embodiment, the processor 402 is configured to:
extract the first information from the UWB signal sent by the second UAV; or
measure the first information based on the UWB signal sent by the second UAV.

In an embodiment, the communication interface 401 is configured to:
send a first request based on the UWB signal in the case where the satellite positioning signal of the first UAV is lost, where the first request is used for requesting the second UAV to carry the second information in the UWB signal.

In an embodiment, the communication interface 401 is configured to:
exchange the UWB signal with the at least three second UAVs every first set period.

In an embodiment, the processor 402 is configured to:
in a case where it is detected that the first UAV has resumed receiving the satellite positioning signal, determine the real-time positioning information of the first UAV based on the received satellite positioning signal.

It should be noted that the specific processing procedures of the processor 402 and the communication interface 401 can be understood with reference to the above method. Of course, in practical applications, the various components in the first UAV are coupled together via a bus system 404. It can be appreciated that the bus system 404 is configured to implement the connection communication between these components. The bus system 404 includes a power bus, a control bus and a status signal bus in addition to a data bus. However for clarity, the various buses are designated as the bus system 404 in FIG. 4.

The memory 403 in the embodiments of the present disclosure is configured to store various types of data to support operation of the first UAV. Examples of such data include any computer program for operating on the first UAV.

It will be appreciated that the memory 403 may be volatile memory or non-volatile memory and may also include both volatile and non-volatile memory. The non-volatile memory can be Read Only Memory (ROM), Programmable Read-Only Memory (PROM), Erasable Programmable Read-Only Memory (EPROM), Electrically Erasable Programmable Read-Only Memory (EEPROM), ferromagnetic random access memory (FRAM), Flash Memory, magnetic surface memory, optical disc, or Compact Disc Read-Only Memory (CD-ROM). The magnetic surface memory may be a magnetic disk memory or a magnetic tape memory. The volatile memory may be a Random Access Memory (RAM) which serves as an external cache. By way of illustration but not limitation, many forms of the RAM are available, for example, Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), and Direct Rambus Random Access Memory (DRRAM). The memory 403 described in the embodiments of the present disclosure is intended to include but not limited to these and any other suitable types of memory.

The method disclosed in the above embodiments of the present disclosure may be applied to or implemented by the processor 402. The processor 402 may be an integrated circuit chip having signal processing capability. In implementation, the operations of the above method may be accomplished by integrated logic circuitry of hardware in processor 402 or by instructions in the form of software. The processor 402 described above may be a general purpose processor, a DSP, other programmable logic device, a discrete gate, transistor logic device, or a discrete hardware component or the like. The processor 402 may implement or perform the methods, steps and logic diagrams disclosed in embodiments of the present disclosure. The general purpose processor can be a microprocessor or any conventional processor. The steps of the method disclosed in connection with the embodiment of the present disclosure can be directly embodied in the execution completion of the hardware decoding processor, or by the combination of the hardware and software modules in the decoding processor. The software module can be located in the storage medium located in a memory 403. The processor reads the programs in the memory 403 to complete the steps of the above method in combination with its hardware.

The processor 402 executes the programs to implement the corresponding flow in each method of the respective embodiment of the present disclosure and will not be repeated herein for the sake of brevity.

In an exemplary embodiment, the embodiments of the present disclosure also provide a storage medium, i.e., a computer storage medium. The storage medium is specifically a computer readable storage medium, for example, including a memory 403 storing computer programs executable by the processor 402 to complete the operations described in the aforementioned method. The computer readable storage medium may be a memory such as FRAM, ROM, PROM, EPROM, EEPROM, Flash Memory, magnetic surface memory, optical disk, or CD-ROM.

In several embodiments provided by the present disclosure, it should be understood that the disclosed devices, terminals and methods can be realized in other ways. The embodiment of the device described above is only schematic. For example, the division of the unit is only a logical function division, and there can be another division method in actual implementation, for example, multiple units or components can be combined or integrated into another system, or some features can be ignored or not implemented. On the other hand, the mutual coupling or direct coupling or communication connection illustrated or discussed can be indirect coupling or communication connection through some interfaces, devices or units, and can be electric, mechanical or other forms.

The unit described as a separation part may or may not be physically separated, and the unit displayed as a unit may or may not be a physical unit, that is, it may be located in one place, or it may be distributed to multiple network units. Some or all of the units can be selected according to the actual needs to achieve the purpose of the embodiment.

In addition, each functional unit in each embodiment of the present disclosure may be integrated in one processing unit, each unit can be separately used as a unit, or two or more units may be integrated in one unit. The integrated unit can be implemented either in the form of hardware or in the form of hardware combined with the software functional unit.

Those of ordinary skill in the art will appreciate that all or part of the steps of the above method embodiments can be accomplished by the hardware related to program instructions, the above programs can be stored in a computer readable storage medium, and when the programs are executed, the steps included in the above method embodiments are performed. The aforementioned storage medium includes various medium capable of storing program codes, such as a removable storage device, a ROM, a RAM, a magnetic disk or an optical disk.

Alternatively, if the integrated unit is implemented in the form of software functional modules and sold or used as an independent product, it can be stored in a computer readable storage medium. Based on such understanding, the technical solution of the present disclosure, the technical proposal of the embodiment of the present application can be embodied in the form of software products in essence or the part that contributes to the prior art. The computer software product is stored in a storage medium, includes several instructions for making a computer device (which can be a personal computer, a server, a network device, etc.) to perform all or part of the steps of the method according to each embodiment of the present disclosure. The aforementioned storage media include: removable storage device, ROM, RAM, disk or optical disk and other media that can store program code.

The above is only the specific embodiments of the present disclosure, but the scope of protection of the present disclosure is not limited to this. Any person skilled in the technical field who can easily think of change or replacement within the technical scope of the present disclosure shall be covered in the scope of protection of the present disclosure. Therefore, the protection scope of the present disclosure shall be subject to the protection scope of the claims.

The invention claimed is:

1. An Unmanned Aerial Vehicle (UAV) positioning method, applied to a first UAV, the method comprising:
   determining first information and second information of each of at least three second UAVs based on an Ultra Wide Band (UWB) signal in a case where a satellite positioning signal of the first UAV is lost, wherein the first information represents a relative distance between each second UAV and the first UAV, and the second information is carried in the UWB signal sent by the second UAV and represents real-time positioning information measured by the second UAV based on a satellite positioning signal; and
   determining real-time positioning information of the first UAV according to the first information and the second information of each of the at least three second UAVs.

2. The UAV positioning method of claim 1, further comprising: before determining the real-time positioning information of the first UAV according to the first information and the second information of each of the at least three second UAVs,
   determining the real-time positioning information of the first UAV based on an Inertial Navigation System (INS) in the case where the satellite positioning signal of the first UAV is lost.

3. The UAV positioning method of claim 2, wherein determining the first information and the second information of each of the at least three second UAVs based on the UWB signal comprises:
   determining the first information and the second information of each of the at least three second UAVs based on the UWB signal in a case where a duration during which the real-time positioning information of the first UAV is determined based on the INS is longer than a set duration.

4. The UAV positioning method of claim 1, further comprising:
   extracting the first information from the UWB signal sent by the second UAV; or
   measuring the first information based on the UWB signal sent by the second UAV.

5. The UAV positioning method of claim 1, further comprising:
   sending a first request based on the UWB signal in the case where the satellite positioning signal of the first UAV is lost, wherein the first request is used for requesting the second UAV to carry the second information in the UWB signal.

6. The UAV positioning method of claim 1, further comprising:
   exchanging the UWB signal with the at least three second UAVs every first set period.

7. The UAV positioning method of claim 1, further comprising:
   in a case where it is detected that the first UAV has resumed receiving the satellite positioning signal, determining the real-time positioning information of the first UAV based on the received satellite positioning signal.

8. An Unmanned Aerial Vehicle (UAV) positioning device, comprising:
   a memory storing processor-executable instructions; and
   a processor arranged to execute the processor-executable instructions to perform operations of:
   determining first information and second information of each of at least three second UAVs based on an Ultra Wide Band (UWB) signal in a case where a satellite positioning signal of a first UAV is lost, wherein the first information represents a relative distance between each second UAV and the first UAV, and the second information is carried in the UWB signal sent by the second UAV and represents real-time positioning information measured by the second UAV based on a satellite positioning signal; and determining real-time positioning information of the first UAV according to the first information and the second information of each of the at least three second UAVs.

9. A first Unmanned Aerial Vehicle (UAV), comprising the UAV positioning device of claim 8.

10. A non-transitory storage medium having stored thereon processor-executable instructions that, when executed by a processor, cause the processor to perform operations of an Unmanned Aerial Vehicle (UAV) positioning method, applied to a first UAV, the method comprising:

determining first information and second information of each of at least three second UAVs based on an Ultra Wide Band (UWB) signal in a case where a satellite positioning signal of the first UAV is lost, wherein the first information represents a relative distance between each second UAV and the first UAV, and the second information is carried in the UWB signal sent by the second UAV and represents real-time positioning information measured by the second UAV based on a satellite positioning signal; and determining real-time positioning information of the first UAV according to the first information and the second information of each of the at least three second UAVs.

11. The non-transitory storage medium of claim 10, wherein the method further comprises: before determining the real-time positioning information of the first UAV according to the first information and the second information of each of the at least three second UAVs, determining the real-time positioning information of the first UAV based on an Inertial Navigation System (INS) in the case where the satellite positioning signal of the first UAV is lost.

12. The non-transitory storage medium of claim 11, wherein determining the first information and the second information of each of the at least three second UAVs based on the UWB signal comprises:

determining the first information and the second information of each of the at least three second UAVs based on the UWB signal in a case where a duration during which the real-time positioning information of the first UAV is determined based on the INS is longer than a set duration.

13. The non-transitory storage medium of claim 10, wherein the method further comprises:

extracting the first information from the UWB signal sent by the second UAV; or measuring the first information based on the UWB signal sent by the second UAV.

14. The non-transitory storage medium of claim 10, wherein the method further comprises:

sending a first request based on the UWB signal in the case where the satellite positioning signal of the first UAV is lost, wherein the first request is used for requesting the second UAV to carry the second information in the UWB signal.

15. The UAV positioning device of claim 8, wherein the processor is arranged to execute the processor-executable instructions to further perform an operation of: before determining the real-time positioning information of the first UAV according to the first information and the second information of each of the at least three second UAVs, determining the real-time positioning information of the first UAV based on an Inertial Navigation System (INS) in the case where the satellite positioning signal of the first UAV is lost.

16. The UAV positioning device of claim 15, wherein determining the first information and the second information of each of the at least three second UAVs based on the UWB signal comprises:

determining the first information and the second information of each of the at least three second UAVs based on the UWB signal in a case where a duration during which the real-time positioning information of the first UAV is determined based on the INS is longer than a set duration.

17. The UAV positioning device of claim 8, wherein the processor is arranged to execute the processor-executable instructions to further perform an operation of:

extracting the first information from the UWB signal sent by the second UAV; or measuring the first information based on the UWB signal sent by the second UAV.

18. The UAV positioning device of claim 8, wherein the processor is arranged to execute the processor-executable instructions to further perform an operation of:

sending a first request based on the UWB signal in the case where the satellite positioning signal of the first UAV is lost, wherein the first request is used for requesting the second UAV to carry the second information in the UWB signal.

19. The UAV positioning device of claim 8, wherein the processor is arranged to execute the processor-executable instructions to further perform an operation of:

exchanging the UWB signal with the at least three second UAVs every first set period.

20. The UAV positioning device of claim 8, wherein the processor is arranged to execute the processor-executable instructions to further perform an operation of:

in a case where it is detected that the first UAV has resumed receiving the satellite positioning signal, determining the real-time positioning information of the first UAV based on the received satellite positioning signal.

* * * * *